US00RE47592E

(19) United States
(12) Reissued Patent
Bhatt et al.

(10) Patent Number: US RE47,592 E
(45) Date of Reissued Patent: Sep. 3, 2019

(54) MANAGING USER INTERFACE CONTROL PANELS

(71) Applicant: Apple Inc., Cupertino, CA (US)

(72) Inventors: Nikhil Bhatt, San Francisco, CA (US); Clem Holloman-Kincaid, San Jose, CA (US)

(73) Assignee: Apple Inc., Cupertino, CA (US)

(21) Appl. No.: 14/704,717

(22) Filed: May 5, 2015

Related U.S. Patent Documents

Reissue of:
(64) Patent No.: 8,438,498
Issued: May 7, 2013
Appl. No.: 13/476,102
Filed: May 21, 2012

U.S. Applications:
(63) Continuation of application No. 12/050,114, filed on Mar. 17, 2008, now Pat. No. 8,185,843.

(51) Int. Cl.
*G06F 15/00* (2006.01)
*G06F 13/00* (2006.01)
*G06F 3/0484* (2013.01)
*G06F 3/0482* (2013.01)

(52) U.S. Cl.
CPC ..... *G06F 3/04847* (2013.01); *G06F 3/0482* (2013.01)

(58) Field of Classification Search
CPC ..... G06F 3/0482; G06F 3/04847
USPC ..... 715/711, 764, 767, 768, 771, 779, 808, 715/810, 841
See application file for complete search history.

(56) References Cited

U.S. PATENT DOCUMENTS 4,686,522 A * 8/1987 Hernandez ..... G06F 3/0481 345/160
5,483,261 A 1/1996 Yasutake
5,488,204 A 1/1996 Mead et al.
5,825,352 A 10/1998 Bisset et al.
5,835,079 A 11/1998 Shieh
5,880,411 A 3/1999 Gillespie et al.
6,188,391 B1 2/2001 Seely et al.
6,310,610 B1 10/2001 Beaton et al.
(Continued)

FOREIGN PATENT DOCUMENTS

JP 2000-163031 A 6/2000
JP 2002-342033 A 11/2002

OTHER PUBLICATIONS

Final Office Action dated Oct. 11, 2012, for U.S. Appl. No. 13/476,102, filed May 21, 2012, eight pages.
(Continued)

*Primary Examiner* — Joshua D Campbell
(74) *Attorney, Agent, or Firm* — Kubota & Basol LLP

(57) ABSTRACT

A computer-implemented method includes displaying a user interface on a display device, the user interface displaying a content item, in response to receiving input, displaying a user interface control panel including a user interface control, the user interface control configured to enable modifying one or more attributes of the content item, and in response to detecting a first selection of the user interface control, displaying a portion of the user interface control panel and hiding a portion of the user interface control panel, the displayed portion of the user interface control panel including the user interface control.

45 Claims, 6 Drawing Sheets

(56) References Cited

U.S. PATENT DOCUMENTS

| | | | | |
|---|---|---|---|---|
| 6,323,846 | B1 | 11/2001 | Westerman et al. | |
| 6,690,387 | B2 | 2/2004 | Zimmerman et al. | |
| 7,015,894 | B2 | 3/2006 | Morohoshi | |
| 7,184,064 | B2 | 2/2007 | Zimmerman et al. | |
| 7,663,607 | B2 | 2/2010 | Hotelling et al. | |
| 7,954,067 | B2 | 5/2011 | Breglio | |
| 8,185,843 | B2 | 5/2012 | Bhatt et al. | |
| 8,438,498 | B2 | 5/2013 | Bhatt et al. | |
| 8,479,122 | B2 | 7/2013 | Hotelling et al. | |
| 2002/0175955 | A1* | 11/2002 | Gourdol | G06F 3/0482 715/821 |
| 2004/0021647 | A1* | 2/2004 | Iwema | G06F 3/0488 345/179 |
| 2005/0183017 | A1* | 8/2005 | Cain | 715/719 |
| 2006/0197753 | A1 | 9/2006 | Hotelling | |
| 2007/0136681 | A1* | 6/2007 | Miller | G06F 3/04817 715/782 |
| 2007/0294634 | A1* | 12/2007 | Kokemohr | G06F 3/04845 715/781 |
| 2008/0052348 | A1* | 2/2008 | Adler et al. | 709/203 |
| 2008/0301578 | A1* | 12/2008 | Olson | 715/802 |
| 2013/0125032 | A1* | 5/2013 | Lettau | G06F 3/0482 715/764 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Jul. 17, 2012, for U.S. Appl. No. 13/476,102, filed May 21, 2012, eleven pages.

Notice of Allowance dated Jan. 30, 2013, for U.S. Appl. No. 13/476,102, filed May 21, 2012, five pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

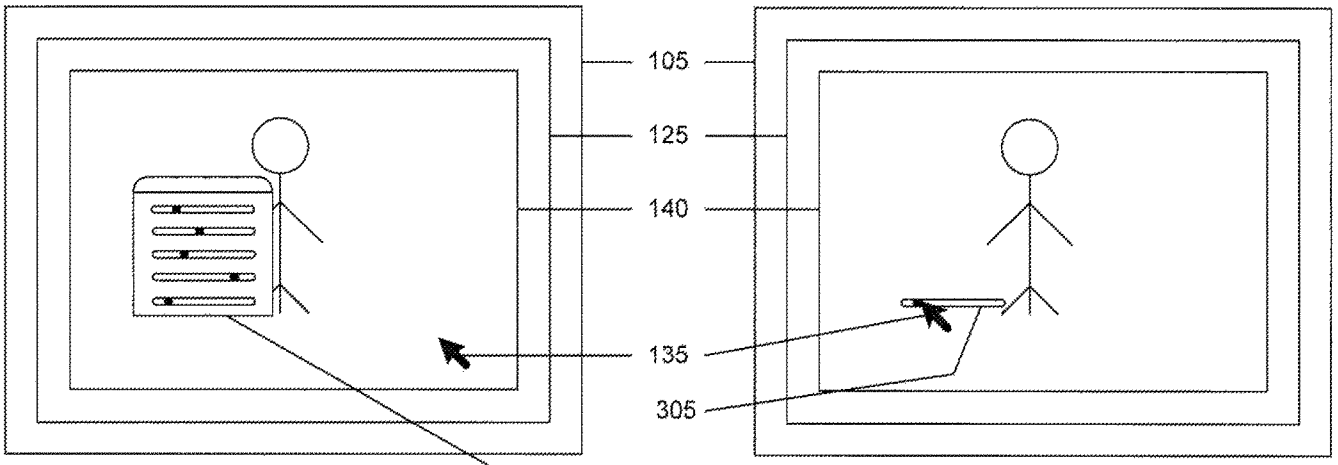
FIG. 3A
FIG. 3B
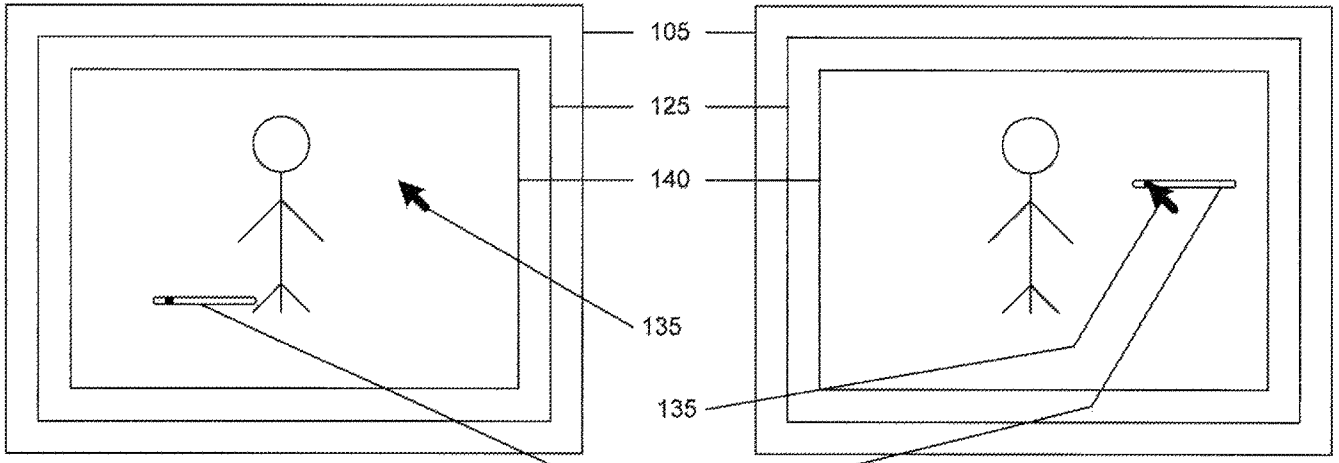
FIG. 3C
FIG. 3D

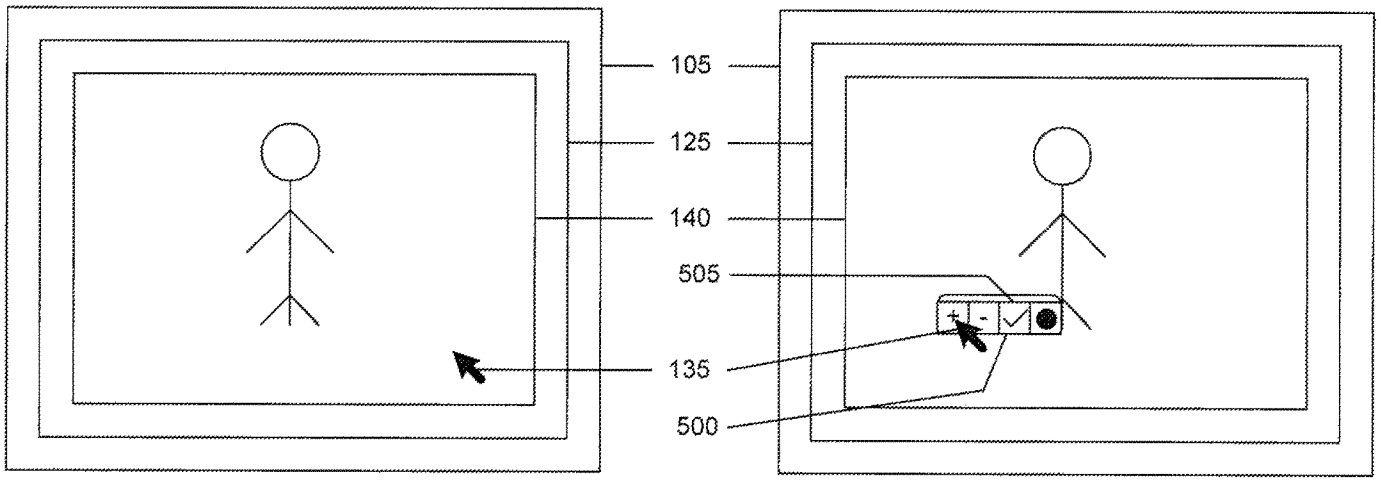
FIG. 5A
FIG. 5B
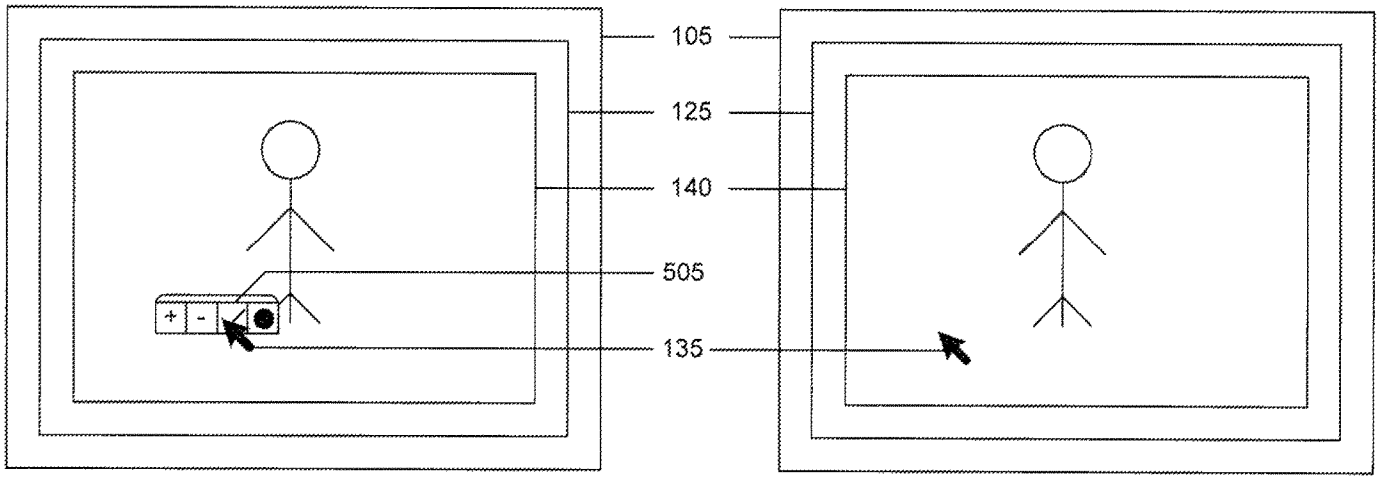
FIG. 5C
FIG. 5D

MANAGING USER INTERFACE CONTROL PANELS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation application of U.S. Ser. No. 12/050,114, filed on Mar. 17, 2008, now U.S. Pat. No. 8,185,843 which is hereby incorporated by reference in its entirety.

TECHNICAL FIELD

The present disclosure relates to managing user interfaces of software applications.

BACKGROUND

Software applications can edit content items such as images, video, audio, documents, and the like. Content items, such as images, can be captured using devices such as digital cameras, stored as images files, e.g., in JPG format, and transferred to storage devices. A software application can retrieve an image file stored in a storage device and display the image file on a display device of a computer system. The images can have one or more attributes, e.g., sharpness, brightness, color, and the like, and each attribute can be assigned a value. Users can edit the appearance of an image by altering the attribute values of the corresponding image using user interface controls offered by a software application.

SUMMARY

This specification describes technologies relating to managing user interface control panels. In one example, an image is displayed in a user interface of a software application. In response to user input, a user interface control panel configured to enable modifying the attributes of the image is displayed in the user interface, e.g., over the image. The control panel includes features, e.g., one or more sliders that can be moved using an input device such as a mouse, to alter the attributes of the image in the user interface. When a user selects a slider in the control panel, all portions of the control panel, except the slider are hidden from display. When the user releases the slider, the hidden portions of the control panel are re-displayed. Further, when the user positions the cursor at a location in the user interface, away from the slider, and selects the location, the slider automatically moves to the selected location. Furthermore, in response to another input from the user, the control panel is hidden from display.

In general, one aspect of the subject matter described in this specification can be implemented in methods that include displaying a user interface on a display device, the user interface displaying a content item, in response to receiving input, displaying a user interface control panel including a user interface control, the user interface control configured to enable modifying one or more attributes of the content item, and in response to detecting a first selection of the user interface control, displaying a portion of the user interface control panel and hiding a portion of the user interface control panel, the displayed portion of the user interface control panel including the user interface control. Other implementations of this aspect include corresponding systems, apparatus, and computer program products.

This, and other aspects, can include one or more of the following features. The method can further include re-displaying the hidden portion of the user interface control panel on the display device in response to detecting an end of the first selection. The content item can be an image and the attributes of the image that the user interface control is configured to enable modifying can include a sharpness, a saturation, a hue, a brightness, and a color. The method can further include hiding all of the user interface control panel in response to receiving new input. The first selection can be active between detecting the first selection and detecting an end of the first selection. The method can further include detecting a selection of a location within the user interface when the first selection is active, and automatically moving the displayed portion of the user interface control panel to the selected location. The input can include selection of a key on a keyboard. The first selection can include selection of the user interface control using a cursor controlled by a pointing device. Detecting the first selection can include detecting a combination of a keystroke and an operation on the cursor. The method can further include displaying only the content item and the user interface control on the display device, and in response to detecting an end of the first selection, displaying the user interface and the user interface control panel. The method can further include detecting a location of a cursor on the display device, and in response to receiving the input, displaying the user interface control panel at the location of the cursor. The method can further include in response to detecting an end of the first selection, automatically hiding the user interface control panel.

Particular implementations of the subject matter described in this specification can be implemented to realize one or more of the following potential advantages. Hiding portions of the user interface control panel that are not being used by a user to alter image attributes reduces screen clutter and allows a user to view more portions of the image that the user is editing. Moving the user interface control based on cursor location can allow a user to move the control away from regions of interest in the image. Enabling a user to control the user interface control panel in response to selections of locations on the user interface decreases a number of inputs that the user has to provide to display and hide the control panel.

The details of one or more implementations are set forth in the accompanying drawings and the description below. Other features, aspects, and advantages will become apparent from the description, the drawings, and the claims.

BRIEF DESCRIPTION OF THE DRAWINGS

FIGS. 3A-3D are schematics of examples of user interfaces including user interface control panels.

FIGS. 5A-5D are schematics of examples of user interfaces displaying user interface control panels at cursor locations.

Like reference numbers and designations in the various drawings indicate like elements.

DETAILED DESCRIPTION

Figure 1:
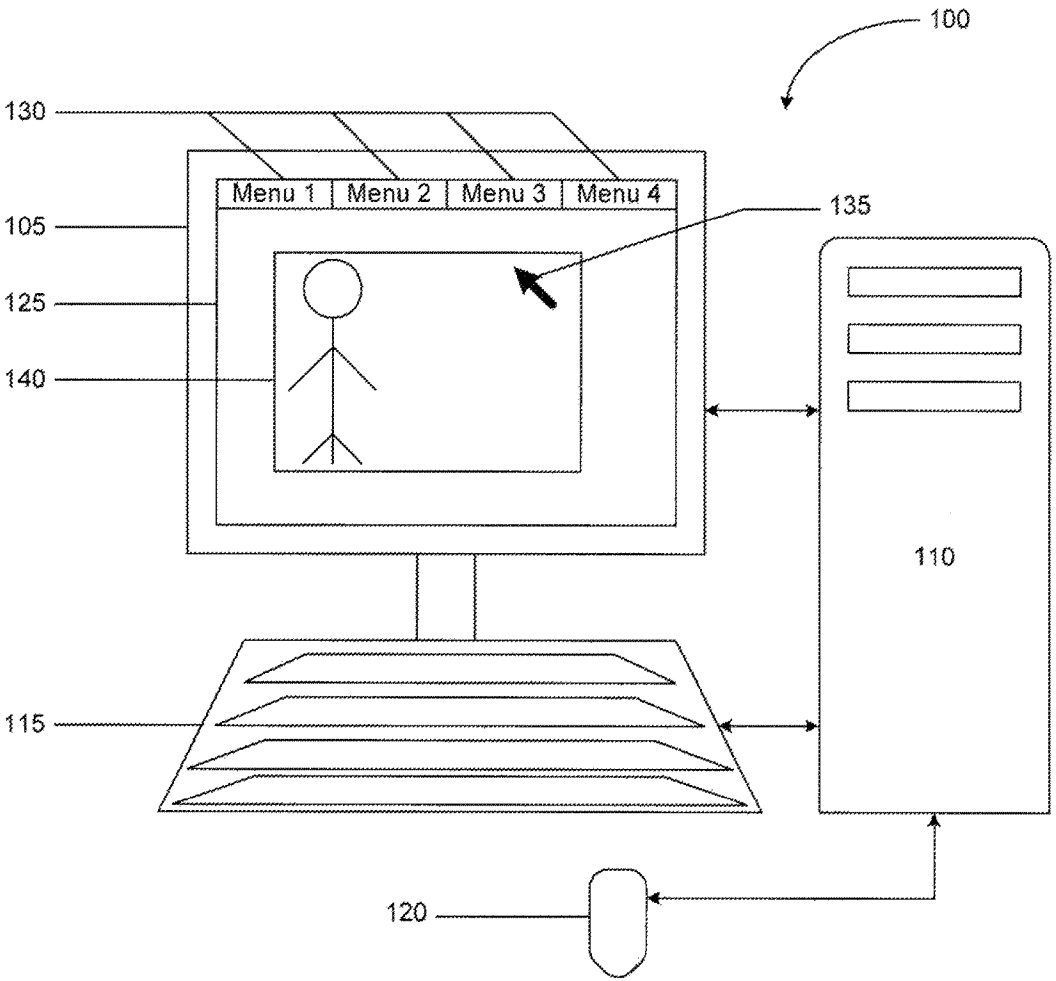
FIG. 1 is a schematic of an example of a system for editing content.

FIG. 1 depicts a schematic of an example of a system 100 for editing content. The system 100 can be any computer system such as a desktop computer, laptop computer, personal digital assistant (PDA), and the like. The system 100 includes a display device 105 operatively coupled to a processing unit 110. In addition, the system 100 includes input devices, such as a keyboard 115 and a pointing device 120, e.g., a mouse, a stylus, and the like, operatively coupled to the processing unit 110. A user can provide input using the keyboard 115 and the pointing device 120, and can view the outcome of the input on the display device 105.

The processing unit 110 is configured to receive a computer program product, e.g., a CD-ROM, tangibly embodied in a computer-readable medium, including instructions to perform operations. For example, the processing unit 110 can include a CD-ROM drive to receive the computer program product, e.g., a CD. The CD can be an installation disk that includes instructions corresponding to a software application that enables editing and management of content, e.g., images, video, audio, documents, and the like. The instructions in the computer program product cause the processing unit 110 to provide a user with a user interface 125 that allows the user to edit and manage content, e.g., images. In some implementations, the images are stored in storage media, e.g., a hard disk, operatively coupled to the processing unit 110. To enable a user to edit and manage content, the user interface 125 is displayed on the display device 105.

In some implementations, upon installing the instructions in the processing unit 110, an icon corresponding to the software application is displayed on the display device 105. In response to a user selecting the icon, e.g., using the pointing device 120, the user interface 125 is displayed on the display device 105. Alternatively, a selectable object corresponding to the software application can be selected from a menu of selectable objects. The user interface 125 includes several menu items 130, e.g., Menu 1, Menu 2, Menu 3, Menu 4, where each menu item 130 includes one or more selectable objects. The selectable objects can be configured to cause the processing unit 110 to perform different operations on content items including opening operations for display and editing, editing operations, storing operations, and the like. In some implementations, a cursor 135 controlled by the pointing device 120 can be displayed on the display device 105. A menu item 130 can be selected by positioning the cursor 135 over a menu item 130 and selecting the menu item 130. Selecting the menu item 130 can cause a menu of selectable objects to be displayed, where each selectable object corresponds to an operation. The cursor 130 can be positioned on a selectable object and the object can be selected to cause the processing unit 110 to perform the corresponding operation.

Alternatively, and in addition, the keyboard 115 can be used to access the menu items 130. One or more keys on the keyboard 115 can be configured such that, in response to a keystroke, the selectable objects of a menu item 130 are displayed. A user can navigate the selectable objects displayed in a menu item 130 using additional keys, e.g., arrow keys, on the keyboard 115 and select an object, e.g., using the "Enter" key on the keyboard 115. In some implementations, the menu items 130 can be accessed using a combination of keys on the keyboard 115 and the cursor 135.

Selecting an object in the menu item 130 can cause the processing unit 110 to display a user interface control panel in the user interface 125. The user interface control panel can include one or more user interface controls that can be selected to edit content. In some implementations, to display the user interface control panel, the user first selects a menu item 130 that causes a list of selectable objects in the menu item 130 to be displayed in the user interface 125. Subsequently, the user selects an object in the menu item 130 that causes a corresponding user interface control panel to be displayed in the user interface 125. In other implementations, a key or a combination of keys on the keyboard 115 can be configured to cause the display of a user interface control panel corresponding to an object in the menu item 130. In such implementations, when the user selects the key or combination of keys corresponding to a user interface control panel, the panel is automatically displayed in the user interface 125. The instructions in the computer program product can include default keys and/or key combinations corresponding to user interface control panels. Alternatively, or in addition, a user can configure keys and/or key combinations to correspond to user interface control panels.

A content item, e.g., an image 140, is displayed in the user interface 125 in response to user input. For example, the user can access a storage device, including content items 140, operatively coupled to the processing unit 110, and select an image 140 that is stored in the storage device. In response, the image 140 can be displayed in the user interface 125. To alter the attributes of the image 140, the user selects objects in the menu items 130 causing the user interface control panels to be displayed. The user can use the user interface controls in the user interface control panels to modify the attributes of the image 140.

Figure 2A:
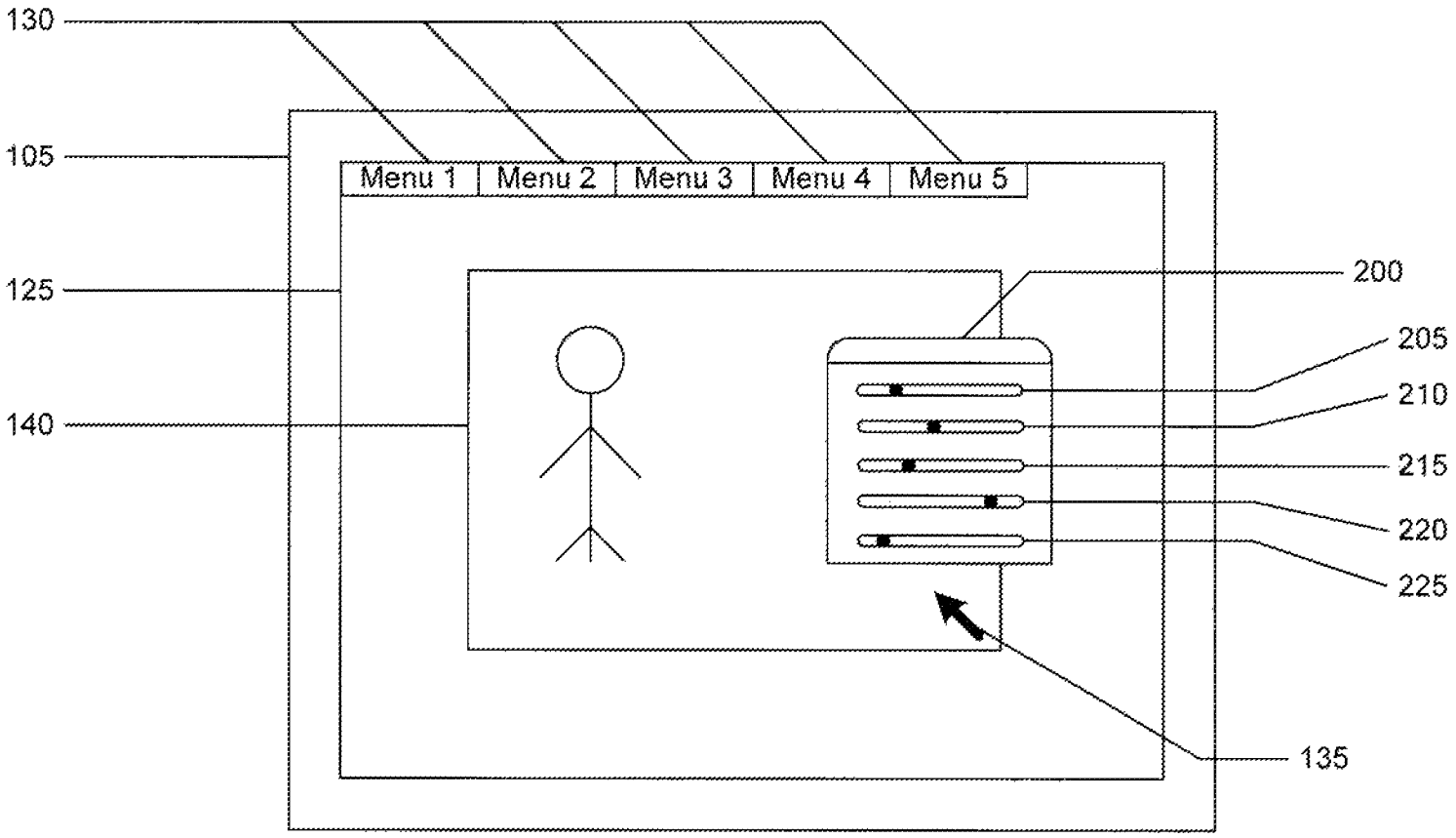
FIGS. 2A and 2B are schematics of examples of a user interface of a software application for editing content.
Figure 2B:
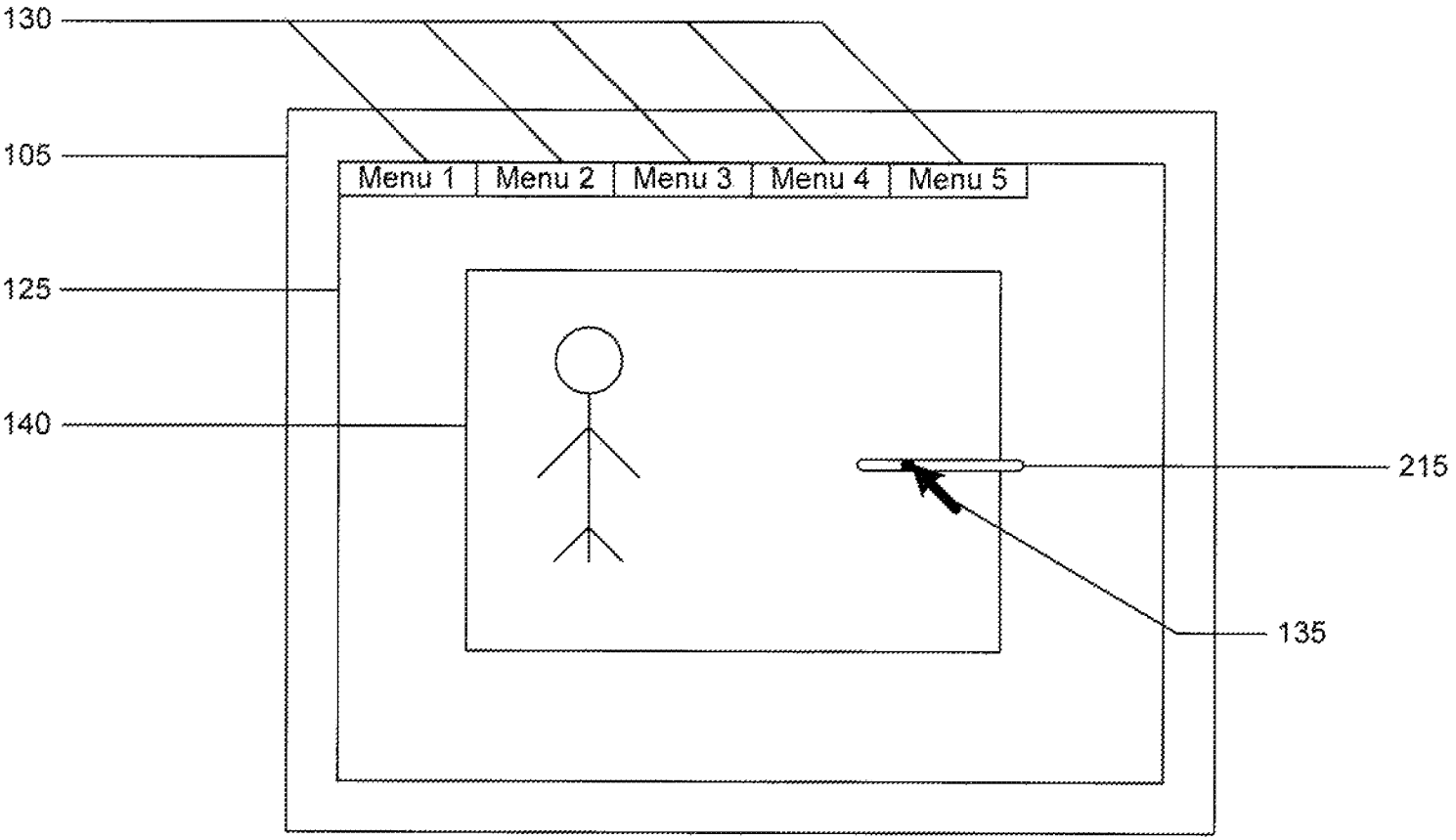

FIGS. 2A and 2B are schematics of examples of a user interface 125 of a software application for editing content, e.g., images, video, and the like. In FIG. 2A, the user interface 125 is displayed on a display device 105 in response to receiving input from a user. An object in one of the menu items 130 in the user interface 125 is configured to enable a user to access content located in storage devices operatively coupled to the processing unit 110. For example, the user can position the cursor 135 on the menu item 130 that includes the object and select the object. In response, a selection panel displaying one or more storage devices operatively coupled to the processing unit 110 is displayed on the display device 105. Alternatively, the user can select one or more keys on the keyboard 115 that are configured to display the selection panel when selected. The user can navigate the storage devices using the cursor 135 or keys on the keyboard 115 or both to locate the image 140. Subsequently, the user can select the image 140 and, in response to the selection, the image is displayed in the user interface 125.

The user may wish to alter one or more attributes of the image 140 displayed in the user interface 125. The attributes can include a color, a sharpness, a brightness, a hue, a saturation, an exposure, white balance, effects, such as vignette, and the like. The software application includes a user interface control panel 200 that includes user interface controls 205, 210, 215, 220, 225, to enable a user to modify the attributes of the image 140. Each user interface control is bounded by a corresponding user interface control area. The user interface control panel 200 is displayed in the user interface 125 in response to user input. In some implementations, a key and/or a key combination on the keyboard 115 can be configured such that in response to a keystroke where the key is selected, the user interface control panel 200 is displayed in the user interface 125. Alternatively, or in addition, the user interface control panel 200 can be accessed by selecting an object in a menu item 130 using the cursor 135. In other examples, icons corresponding to the control panel 200, can be displayed in the user interface 125. The control panel 200 can be displayed in response to selecting the icon using the cursor 135. The software application can include several user interface control panels that a user can select for displaying using the keyboard 115, the pointing device 120, or both.

The control panel 200 can be of different sizes and shapes depending, in part, upon the number of user interface controls in the control panel 200. In some implementations, the control panel 200 is bounded by a control panel area that can be, e.g., substantially rectangular and can lie within the user interface 125. The control panel 200 can include tabbed portions that enable including several user interface controls in the same control panel 200 without increasing the control panel area. Alternatively, and in addition, the control panel 200 can include selectable objects, the selection of which can expand or shrink the control panel 200, thereby increasing or decreasing, respectively, the control panel area. All or portions of the control panel area can lie over the image 140, thereby covering a portion of the image 140. The control panel 200 can be moved to any location in the user interface 125. For example, a user can position the cursor 135 operated by a mouse over the control panel 200, select a button on the mouse, drag the control panel 200 to a location on the user interface 125 and release the mouse button.

The user interface controls 205, 210, 215, 220, and 225 can, each, correspond to an attribute of the image 140 that can be altered. For example, user interface control 205 can correspond to the contrast attribute, user interface control 210 can correspond to the saturation attribute, and the like. In some implementations, the user interface controls 205, 210, 215, 220, and 225 can, each, be displayed as a slider including a button within an area bound by the slider. The position of the button within each slider can correspond to a level of the attribute corresponding to the user interface control. For example, user interface control 215 can correspond to the brightness attribute that can be assigned a value between 0 and 99. The slider corresponding to the control 215 can be configured such that the left end and the right end of the slider correspond to brightness values of 0 and 99, respectively. Positioning the button of the slider between the left and right ends of the slider can correspond to a value between 0 and 99.

Further, the software application can be configured such that as the user moves the slider of the control 215 between the left and the right ends, the image 140 is automatically updated to display an effect of changing the attribute value. In some implementations, a text field (not shown) can be displayed adjacent to each slider and can be configured to display a value corresponding to the position of the button in the slider corresponding to the control. For example, if the button is positioned at the left end of the slider, the text field displays 0, and if the button is positioned at the right end of the slider, the text field displays 99. In some implementations, a user can enter a value for an attribute into the text field. In response to receiving the value, the position of the button in the slider can be automatically altered to match the attribute value. In some implementations, the user interface control panel 200 can include additional information that corresponds to each user interface control in the control panel 200. For example, a slider in the control panel 200 can include a graphical display indicating a plot of the attribute value that the slider is used to modify. When the button in the slider is moved, the graphical display can be updated. Each control in the control panel can include corresponding additional information. In this manner, the user can use either sliders on the controls or the text field corresponding to the sliders to change attributes of the image 140.

In some implementations, when the user positions the cursor 135 on the slider 215 and changes the position of the button in the slider, user interface control panel including the controls is displayed in the user interface 125. For example, a control area which is the area bounding the user interface control 215 and a control panel area, which is the area bounding each control, can be displayed in the user interface 125. The control panel area may be located over the image 140 preventing the user from viewing the effect of changing the image attribute in the area beneath the control panel area. In some implementations, the user can move the control panel area to a separate location within the user interface 125.

In some implementations, the user can select, e.g., a key on the keyboard 115 and subsequently select the slider of the control 215. As illustrated in FIG. 2B, in response, a portion of the user interface control is hidden from display and a portion of the user interface control panel is displayed. The displayed portion of the user interface control panel includes the selected control 215. For example, all portions of the user interface control panel 200, except for the user interface control 215, are hidden from display. In implementations where the user interface control includes additional information, the displayed portions can include the user interface control and the additional information. The user can change the position of the button in the slider corresponding to the control 215 to change the attribute of the image 140. The image 140 can be automatically updated as the position of the button in the slider is changed to display an effect of changing the attribute value. Subsequently, the user can select a key on the keyboard 115 to cause the re-display of the portion of the control panel 200 that was hidden from display. Subsequently, the user can select the key on the keyboard 115 followed by another control, e.g., control 225. In response, portions of the control panel 200 except for the control 225 can be hidden from display. Subsequently, in response to the selection of a key on the keyboard 115, the control panel 200 can be re-displayed.

In implementations where the control is displayed as a text field in the control panel 200, in response to receiving input, e.g., from the keyboard 115, all portions of the control panel 200 except the text field can be hidden from display. The user can enter attribute values into the text field. Subsequently, in response to receiving another input, e.g., from the keyboard 115, the control panel 200 can be re-displayed. In implementations where the control 215 is displayed as a combination of component controls, e.g., a slider and a text field, if the slider is selected, the slider and the text field corresponding to control 215 can be displayed when input is received, e.g., from the keyboard 115, while other portions of the control panel 200 can be hidden from display. The user can change the attribute either by using the slider or by using the text field or both. If the text field is selected, then the text field corresponding to control 215 can be displayed while the slider corresponding to control 215 and other portions of the control panel 200 can be hidden from display. In some implementations, more than one control panel can be displayed, where each control panel includes several controls. In response to receiving input, e.g., from the keyboard 115, when a control on one control panel is selected, the control panel area corresponding to the panel with the selected control and that corresponding to all other displayed control panels can be hidden from display. Subsequent to the user changing the attribute value and providing an input, e.g., using the keyboard 115, all the control panels can be re-displayed. Subsequent to changing the attributes using the user interface controls 205-225 displayed in the user interface control panel 200, the user can provide an input, e.g., by selecting a key on the keyboard 115, to cause the user interface control panel 200 to be removed from display.

In some implementations, in response to a user selecting, e.g., the "Shift" key from the keyboard 115, the user interface control panel 200 including one or more user interface controls can be displayed in the user interface 125. When the user selects a user interface control by holding down the "Alt" key and using the mouse, portions of the control panel 200 that are not selected can be hidden from display. The hidden portions of the control panel 200 can be re-displayed when the user releases the "Alt" key. In other implementations, the second input can be a keystroke where a user selects, e.g., the "Ctrl" key on the keyboard 115 and then selects the user interface control using the cursor 135 without holding down the "Ctrl" key. Subsequent to changing the attribute of the image 140, when the user selects the "Ctrl" key, the hidden portions of the control panel 200 can be re-displayed. Subsequently, in response to the user selecting the "Shift" key again, the control panel 200 can be hidden from display. Although "Shift," "Ctrl," and "Alt" keys are chosen in this implementation, other keys and/or key combinations can be selected to cause the display and hiding of all or portions of the user interface control panels 200.

FIGS. 3A-3D depict schematics of examples of a user interface 125 including user interface control panels and user interface controls. As illustrated in FIG. 3A, an image 140 stored in a storage device is displayed in the user interface 125. In response to receiving an input from a user, e.g., a keystroke, a user interface control panel 300 is displayed at a location in the user interface 125. The control panel 300 includes one or more user interface controls 305 that can be used to modify the attributes of the image 140. A cursor 135, displayed on the display device 105, can be used to select the control 305 to modify the attributes of the image 140. The control 305 can include a slider corresponding to an attribute of the image 140 that can be modified using the slider in the control 305. As the slider is modified, the attribute of the image 140 can be automatically updated to enable visualizing an effect of changing the attribute on the image 140. Alternatively, or in addition, the control 305 can include a text field into which values of attributes can be entered using a keyboard 115.

In some implementations, the user can hold a key on the keyboard 115 and select the user interface control 305 in the control panel 300. In response, as illustrated in FIG. 3B, only the area occupied by the control 305 is displayed in the user interface 125 while portions of the control panel 300 that are not selected are hidden from display. The control 305 can be configured to enable a user to change values of an image attribute and can include a slider including a button within the area bounded by the slider. The user can change the position of the button using the cursor 135 to change the attributes of the image.

While portions of the control panel 300 except control 305 are hidden from display, the user can move the cursor 135 to a location in the user interface 125 away from the control 305, as illustrated in FIG. 3C. When the user selects the location, e.g., by clicking the mouse, the control 305 automatically moves from the present location of the control 305 to the location that the user selected, as illustrated in FIG. 3D. When the user releases the key that the user initially held to cause portions of the control panel 300 to be hidden, the hidden portions can be re-displayed in the user interface 125.

Figure 4:
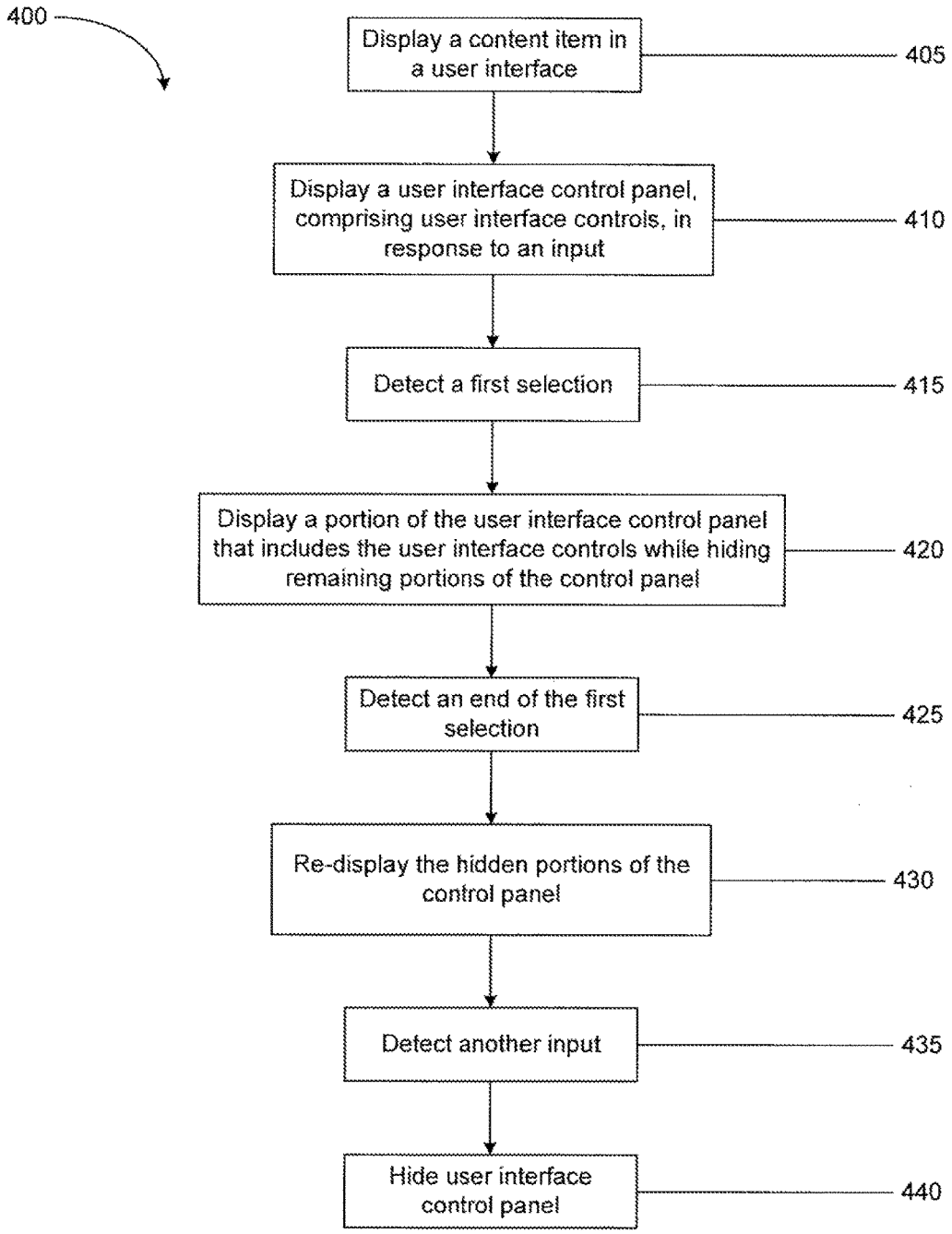
FIG. 4 is a flow diagram of an example of a process for managing user interface control panels.

FIG. 4 is a flow diagram of an example of a process 400 for managing user interface control panels. The process 400 displays a content item in a user interface at 405. For example, the content item is an image stored in a storage device which is operatively coupled to a processing unit of a computer system including a display device, e.g., LCD monitor, CRT monitor, and the like, and one or more input devices, e.g., keyboard, mouse, stylus, and the like. The user interface is provided by a software application installed in the computer system. Upon installation, the software application is represented by an icon displayed on the display device which, when selected using the input device, causes the user interface to be displayed on the display device.

The process 400 displays a user interface control panel, comprising user interface controls, in response to an input at 410. For example, the user can access a storage device on which the content, e.g., an image, is stored, and cause the image to be displayed on the display device. The software application can include instructions that cause a key on the keyboard to be configured to display a user interface control panel on the display device when selected. The user can select the key, and in response, the user interface control panel can be displayed in the user interface. The control panel can be included in a control panel area, where all or portions of the control panel area lie over the area occupied by the image. The control panel area can further include a control area, where the control area includes one or more user interface controls. The user interface controls can enable changing one or more attributes of the image such as sharpness, brightness, contrast, hue, saturation, and the like.

The process 400 can detect a first selection at 415. For example, the user interface control can be a slider with a button within the region bounded by the slider, a text field, or a combination thereof. A first selection can include a selection of the button in the slider, a positioning of a cursor in the text field to enter values, and the like. In some implementations, the first selection can be detected when a user selects a key on the keyboard and then selects the user interface control. For example, a first selection can be detected when the user holds down the "Ctrl" key on the keyboard and selects the button in the slider with the mouse. Alternatively, a first selection can be detected when the user presses the "Alt" key on the keyboard once, releases the "Alt" key, and selects the button in the slider with the mouse.

In response to detecting the first selection, the process 400 displays a portion of the user interface control panel that includes the user interface controls while hiding remaining portions of the control panel at 420. For example, the control panel area can include several controls, e.g., sliders with buttons, where each control is bounded by a control area. In response to detecting the first selection, only the control area corresponding to the selected control is displayed on the display device while other portions of the control panel area are hidden from display. Alternatively, or in addition, an appearance of the selected control can be altered to increase the visibility of the control, e.g., by highlighting the control. Further, the appearance of the control area corresponding to the selected control can also be altered, e.g., by highlighting, to improve the visibility of the selected control. The user can change the attributes of the image using the control. In some implementations, the highlighting can be based on the attributes, e.g., color, brightness, sharpness, and the like, of the content item in the user interface. For example, if the content item is displayed as having a dark color, then the selected control and the corresponding control area can be highlighted to have a brighter color in contrast to the dark color of the content item.

The process 400 detects an end of the first selection at 425. For example, once the user has completed changing attributes of the image the user releases the mouse button. The end of the first selection is detected when the user releases the mouse button and the key on the keyboard that were used for the first selection.

Upon detecting the end of the first selection, the process 400 re-displays the hidden portions of the control panel at 430. For example, in implementations where the user held down the "Ctrl" key on the keyboard and used the mouse to cause portions of the control panel to be hidden from display, once the user releases the "Ctrl" key, the hidden portions are re-displayed.

The process 400 detects another input at 435. For example, the input can be same as the input that initially caused the user interface control panel to be displayed, namely, the selection of the "Shift" key.

In response to detecting another input, the process 400 hides the user interface control panel from display. For example, when the user presses the "Shift" key again, the control panel is hidden from display.

The first selection can be active between detecting the first selection at 415 and detecting an end of the first selection at 425. In this duration, the user can move the cursor from a location over the user interface control to a new location in the user interface and select the new location. In response to the selection of the new location, the displayed portions of the control panel can be automatically moved to the new location. In some implementations, when the first selection is active, all portions of the user interface except the image and the user interface control can be hidden from display. In other implementations, a black screen can be displayed in the entire display device and the image and the user interface control can be displayed over the black screen. As the user changes the attribute values of the image using the control, the image can be automatically updated to enable the user to visualize an effect of changing the attribute values. Displaying only the image and the control over a black screen can reduce distractions allowing a user to focus only changes to the image.

FIGS. 5A-5D depicts schematics of examples of user interfaces displaying user interface control panels at cursor locations. As illustrated in FIG. 5A, a user interface 125 including an image 140 and a cursor 135 are displayed on a display device 105. The user interface 125 can occupy all or a portion of the area of the display device 105. The cursor 135 is controlled by a pointing device, e.g., a mouse. A user can move the cursor to any location on the display device 125. As illustrated in FIG. 5B, when a user moves the cursor 135 to a location in the user interface 125 and selects the location, a user interface control panel 500 including one or more user interface controls 505 is displayed at the location of the mouse. For example, each user interface control 500 is displayed in a rectangular area and each rectangular area is positioned adjacent to each other to form a row of user interface controls 505. The first user interface control 505 is displayed at the location of the cursor 135. Each user interface control 505 is represented by a symbol, e.g., "+" sign, and is configured to perform one or more operations, e.g., changing one or more attributes of the image 140. As illustrated in FIG. 5C, the user moves the cursor 135 to the desired user interface control 505 using the pointing device and selects the control 505. In response, the operation that the selected user interface control 505 is configured to perform, can be performed. As illustrated in FIG. 5D, once the user selects the desired user interface control 505, the user interface control panel 500 is automatically hidden from display.

In some implementations, selecting a user interface control 505 can cause an additional user interface control panel to be displayed. The additional user interface control panel can be related to the selected user interface control and include additional controls to perform operations. In such implementations, portions of the user interface control panel that were not selected can be automatically hidden once the user selects a user interface control. Further, once the user selects one of the additional controls and performs an operation, the additional controls can be hidden from display.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.\

While this specification contains many specifics, these should not be construed as limitations on the scope of the disclosure or of what may be claimed, hut rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results. In some implementations, the location for displaying the user interface control panel can be chosen based on a color at a location of the image. For example, the default color for representing the user interface control panel can be predominantly light. The image can include light and dark colored regions. The user interface control panel can be displayed over a dark region to enhance visibility of the user interface control panel. In other implementations, the location of the user interface control panel can be fixed. The controls and other portions of the control panel can be changed based on the location where the control panel is displayed. For example, if the control panel is displayed over a light colored region, then the control panel can be displayed in a dark color, and vice versa.

In some implementations, the images and the user interface can be stored at a remote location, e.g., a server. The server can be operatively coupled to the processing unit through one or more wired or wireless networks, e.g., the Internet, Wi-Fi networks, and the like. For example, a user can access the server through the Internet by entering a uniform resource identifier (URI), that points to the server, in a web browser. The user can upload content, including images, for storage on the server, where each item of content can be assigned a corresponding URI. The user can enter the URI of an image in the web browser to view the image stored on the server. The server can be configured to present the user interface in the web browser to enable viewing images. In addition, the server can include the user interface control panel including the user interface controls to edit images, e.g., change image attributes. The user can remotely access the user interface controls and perform operations on the images stored in the server.

In some implementations, the location of the control panel can be fixed such that the control panel is displayed at the same location in the user interface 125 every time. In other implementations, the location of the control panel can be changed by a user before being hidden from display. Subsequently, the control panel area can be displayed at the previous location where the control panel was moved. Although images are used as examples of content items that can be displayed in the user interface and edited using the user interface controls, content items of any type, e.g., video files, audio files, documents, and the like, can be edited by the operations described in this disclosure.

What is claimed is:

1. A computer-implemented method comprising:

displaying a user interface on a display device, the user interface displaying a content item;

in response to receiving input, displaying a first user interface control panel including a first user interface control *and a second user interface control*, the first user interface control [configured to enable modifying one or more attributes] *having a plurality of states that correspond to different values for a first attribute* of the content item; [and]

*receiving an input directed to the first user interface control; and* in response to [detecting a first selection of the first user interface control] *receiving the input directed to the first user interface control*:

hiding at least a portion of the first user interface control panel, *including ceasing to display the second user interface control in the first user interface control panel to reveal content underneath the first user interface control panel,* and displaying a second user interface control panel including a [second] *third* user interface control, the [second] *third* user interface control [configured to enable] *having a plurality of states that correspond to different values for* an operation related to the first user interface control.

2. The method of claim 1, comprising detecting a location of a cursor on the display device; and in response to receiving the input, displaying the first user interface control panel at the location of the cursor.

3. The method of claim 1, comprising, in response to detecting a first selection of the [second] *third* user interface control, hiding the second user interface control panel.

4. The method of claim 1, wherein*:*

*the input directed to the first user interface control comprises a first selection of the first user interface control, and* the first selection is active between detecting the first selection and detecting an end of the first selection.

5. The method of claim 1, wherein [input comprises] *displaying the first user interface control panel is in response to a* selection of a key on a keyboard.

6. The method of claim 1, wherein the [first selection] *input directed to the first user interface control* comprises selection of the *first* user interface control using a cursor controlled by a pointing device.

7. A non-transitory computer-readable medium storing instructions to cause a data processing apparatus to perform operations comprising:

displaying a user interface on a display device, the user interface displaying a content item;

in response to receiving input, displaying a first user interface control panel including a first user interface control *and a second user interface control*, the first user interface control [configured to enable modifying one or more attributes] *having a plurality of states that correspond to different values for a first attribute* of the content item; [and]

*receiving an input directed to the first user interface control; and* in response to [detecting a first selection of the first user interface control] *receiving the input directed to the first user interface control*:

hiding at least a portion of the first user interface control panel, *including ceasing to display the second user interface control in the first user interface control panel to reveal content underneath the first user interface control panel*, and displaying a second user interface control panel including a [second] *third* user interface control, the [second] *third* user interface control [configured to enable] *having a plurality of states that correspond to different values for* an operation related to the first user interface control.

8. The non-transitory computer-readable medium of claim 7, the operations comprising detecting a location of a cursor on the display device; and in response to receiving the input, displaying the first user interface control panel at the location of the cursor.

9. The non-transitory computer-readable medium of claim 7, the operations comprising, in response to detecting a first selection of the [second] *third* user interface control, hiding the second user interface control panel.

10. The non-transitory computer-readable medium of claim 7, wherein*:*

*the input directed to the first user interface control comprises a first selection of the first user interface control, and* the first selection is active between detecting the first selection and detecting an end of the first selection.

11. The non-transitory computer-readable medium of claim 7, wherein [input comprises] *displaying the first user interface control panel is in response to a* selection of a key on a keyboard.

12. The non-transitory computer-readable medium of claim 7, wherein the [first selection] *input directed to the first user interface control* comprises selection of the *first* user interface control using a cursor controlled by a pointing device.

13. A system comprising:

a processor; and a computer-readable medium encoding instructions to cause the processor to perform operations comprising:

displaying a user interface on a display device, the user interface displaying a content item;

in response to receiving input, displaying a first user interface control panel including a first user interface control *and a second user interface control*, the first user interface control [configured to enable modifying one or more attributes] *having a plurality of states that correspond to different values for a first attribute* of the content item; [and]

*receiving an input directed to the first user interface control; and* in response to [detecting a first selection of the first user interface control] *receiving the input directed to the first user interface control*:

hiding at least a portion of the first user interface control panel, *including ceasing to display the second user interface control in the first user interface control panel to reveal content underneath the first user interface control panel*, and displaying a second user interface control panel including a [second] *third* user interface control, the [second] *third* user interface control [configured to enable] *having a plurality of states that correspond to different values for* an operation related to the first user interface control.

14. The system of claim 13, the operations comprising detecting a location of a cursor on the display device; and in response to receiving the input, displaying the first user interface control panel at the location of the cursor.

15. The system of claim 13, the operations comprising, in response to detecting a first selection of the [second] *third* user interface control, hiding the second user interface control panel.

16. The system of claim 13, wherein*:*

*the input directed to the first user interface control comprises a first selection of the first user interface control, and* the first selection is active between detecting the first selection and detecting an end of the first selection.

17. The system of claim 13, wherein [input comprises] *displaying the first user interface control panel is in response to a* selection of a key on a keyboard.

18. The system of claim 13, wherein the [first selection] *input directed to the first user interface control* comprises selection of the *first* user interface control using a cursor controlled by a pointing device.

*19. A method comprising:*

*at an electronic device with one or more processors, memory, and a display device:*

*in response to receiving an input, displaying, with the display device, a control panel including a plurality of controls, wherein:*

*displaying the control panel includes concurrently displaying a first control and a second control of the plurality of controls; and*

*the first control includes a moveable user interface element for adjusting a value associated with the first control;*

*while displaying the control panel including concurrently displaying the first control and the second control, receiving a sequence of one or more inputs associated with the first control, wherein the sequence of one or more inputs includes a holding portion and a releasing portion;*

*in response to receiving a respective input of the sequence of one or more inputs associated with the first control, hiding a first portion of the control panel, to reveal content underneath the first portion of the control panel, that includes at least the second control;*

*while the first portion of the control panel is hidden, detecting a respective input corresponding to the holding portion of the sequence of one or more inputs that corresponds to moving the moveable user interface element for adjusting the value associated with the first control;*

*in response to moving the moveable user interface element in the first control while the first portion of the control panel that includes the second control is hidden, adjusting the value associated with the first control in accordance with the respective input corresponding to the holding portion of the sequence of one or more inputs; and*

*in response to detecting the releasing portion of the sequence of one or more inputs that corresponds to a termination of the holding portion of the sequence of one or more inputs, redisplaying the first portion of the control panel.*

*20. The method of claim 19, wherein the value corresponds to a brightness level for displaying one or more user interface objects on the display device.*

*21. The method of claim 19, wherein:*

*prior to receiving the sequence of one or more inputs, the first portion of the control panel is displayed concurrently with the first control while the movable user interface element is displayed at a first location in the first control, and*

*after redisplaying the first portion of the control panel, the first portion of the control panel is displayed concurrently with the first control while the movable user interface element is displayed at a second location in the first control that is different from the first location in the first control.*

*22. The method of claim 19, wherein:*

*the sequence of one or more inputs comprises a specified input having a selection portion, the holding portion and the releasing portion.*

*23. The method of claim 22, wherein the selection portion comprises a depression of a key on a keyboard, the holding portion comprises a continued depression of the key on the keyboard, and the releasing portion comprises a release of the key on the keyboard.*

*24. The method of claim 19, wherein the value corresponds to an attribute associated with an appearance of a display item displayed by the display device.*

*25. The method of claim 19, wherein:*

*the first control comprises a slider having the moveable user interface element for adjusting the value associated with the slider, the position of the moveable user interface element in the slider corresponding to the value,*

*the sequence of one or more inputs comprises an input selecting the moveable user interface element in the slider, and an input changing a position of the moveable user interface element in the slider, and*

*adjusting the value associated with the first control is in accordance with the input changing the position of the moveable user interface element in the slider.*

*26. The method of claim 25, wherein:*

*the slider is displayed along a first axis with respect to the display device, and*

*the input changing the position of the moveable user interface element in the slider comprises a movement along the first axis.*

*27. The method of claim 19, wherein:*

*adjusting the value associated with the first control comprises manipulating the first control in accordance with the respective input corresponding to the holding portion of the sequence of one or more inputs to adjust the value associated with the first control.*

*28. A non-transitory computer-readable medium storing instructions to cause a data processing apparatus to perform operations comprising:*

*in response to receiving an input, displaying, with the display device, a control panel including a plurality of controls, wherein:*

*displaying the control panel includes concurrently displaying a first control and a second control of the plurality of controls; and*

*the first control includes a moveable user interface element for adjusting a value associated with the first control;*

*while displaying the control panel including concurrently displaying the first control and the second control, receiving a sequence of one or more inputs associated with the first control, wherein the sequence of one or more inputs includes a holding portion and a releasing portion;*

*in response to receiving a respective input of the sequence of one or more inputs associated with the first control, hiding a first portion of the control panel, to reveal content underneath the first portion of the control panel, that includes at least the second control;*

*while the first portion of the control panel is hidden, detecting a respective input corresponding to the holding portion of the sequence of one or more inputs that corresponds to moving the moveable user interface element for adjusting the value associated with the first control;*

*in response to moving the moveable user interface element in the first control while the first portion of the control panel that includes the second control is hidden, adjusting the value associated with the first control in accordance with the respective input corresponding to the holding portion of the sequence of one or more inputs; and*

*in response to detecting the releasing portion of the sequence of one or more inputs that corresponds to a termination of the holding portion of the sequence of one or more inputs, redisplaying the first portion of the control panel.*

*29. The non-transitory computer-readable medium of claim 28, wherein the value corresponds to a brightness level for displaying one or more user interface objects on the display device.*

*30. The non-transitory computer-readable medium of claim 28, wherein:*

*prior to receiving the sequence of one or more inputs, the first portion of the control panel is displayed concurrently with the first control while the movable user interface element is displayed at a first location in the first control, and*

*after redisplaying the first portion of the control panel, the first portion of the control panel is displayed concurrently with the first control while the movable user interface element is displayed at a second location in the first control that is different from the first location in the first control.*

*31. The non-transitory computer-readable medium of claim 28, wherein:*

*the sequence of one or more inputs comprises a specified input having a selection portion, the holding portion and the releasing portion.*

*32. The non-transitory computer-readable medium of claim 31, wherein the selection portion comprises a depression of a key on a keyboard, the holding portion comprises a continued depression of the key on the keyboard, and the releasing portion comprises a release of the key on the keyboard.*

*33. The non-transitory computer-readable medium of claim 28, wherein the value corresponds to an attribute associated with an appearance of a display item displayed by the display device.*

*34. The non-transitory computer-readable medium of claim 28, wherein:*

*the first control comprises a slider having the moveable user interface element for adjusting the value associated with the slider, the position of the moveable user interface element in the slider corresponding to the value,*

*the sequence of one or more inputs comprises an input selecting the moveable user interface element in the slider, and an input changing a position of the moveable user interface element in the slider, and*

*adjusting the value associated with the first control is in accordance with the input changing the position of the moveable user interface element in the slider.*

*35. The non-transitory computer-readable medium of claim 34, wherein:*

*the slider is displayed along a first axis with respect to the display device, and*

*the input changing the position of the moveable user interface element in the slider comprises a movement along the first axis.*

*36. The non-transitory computer-readable medium of claim 28, wherein:*

*adjusting the value associated with the first control comprises manipulating the first control in accordance with the respective input corresponding to the holding portion of the sequence of one or more inputs to adjust the value associated with the first control.*

*37. A system comprising:*

*a processor; and*

*a computer-readable medium encoding instructions to cause the processor to perform operations comprising:*

*in response to receiving an input, displaying, with the display device, a control panel including a plurality of controls, wherein:*

*displaying the control panel includes concurrently displaying a first control and a second control of the plurality of controls; and*

*the first control includes a moveable user interface element for adjusting a value associated with the first control;*

*while displaying the control panel including concurrently displaying the first control and the second control, receiving a sequence of one or more inputs associated with the first control, wherein the sequence of one or more inputs includes a holding portion and a releasing portion;*

*in response to receiving a respective input of the sequence of one or more inputs associated with the first control, hiding a first portion of the control panel, to reveal content underneath the first portion of the control panel, that includes at least the second control;*

*while the first portion of the control panel is hidden, detecting a respective input corresponding to the holding portion of the sequence of one or more inputs that corresponds to moving the moveable user interface element for adjusting the value associated with the first control;*

*in response to moving the moveable user interface element in the first control while the first portion of the control panel that includes the second control is hidden, adjusting the value associated with the first control in accordance with the respective input corresponding to the holding portion of the sequence of one or more inputs; and*

*in response to detecting the releasing portion of the sequence of one or more inputs that corresponds to a termination of the holding portion of the sequence of one or more inputs, redisplaying the first portion of the control panel.*

*38. The system of claim 37, wherein the value corresponds to a brightness level for displaying one or more user interface objects on the display device.*

*39. The system of claim 37, wherein:*

*prior to receiving the sequence of one or more inputs, the first portion of the control panel is displayed concurrently with the first control while the movable user interface element is displayed at a first location in the first control, and*

*after redisplaying the first portion of the control panel, the first portion of the control panel is displayed concurrently with the first control while the movable user interface element is displayed at a second location in the first control that is different from the first location in the first control.*

*40. The system of claim 37, wherein:*

*the sequence of one or more inputs comprises a specified input having a selection portion, the holding portion and the releasing portion.*

*41. The system of claim 40, wherein the selection portion comprises a depression of a key on a keyboard, the holding portion comprises a continued depression of the key on the keyboard, and the releasing portion comprises a release of the key on the keyboard.*

*42. The system of claim 37, wherein the value corresponds to an attribute associated with an appearance of a display item displayed by the display device.*

*43. The system of claim 37, wherein:*

*the first control comprises a slider having the moveable user interface element for adjusting the value associated with the slider, the position of the moveable user interface element in the slider corresponding to the value,*

*the sequence of one or more inputs comprises an input selecting the moveable user interface element in the slider, and an input changing a position of the moveable user interface element in the slider, and*

*adjusting the value associated with the first control is in accordance with the input changing the position of the moveable user interface element in the slider.*

*44. The system of claim 43, wherein:*

*the slider is displayed along a first axis with respect to the display device, and*

*the input changing the position of the moveable user interface element in the slider comprises a movement along the first axis.*

*45. The system of claim 37, wherein:*

*adjusting the value associated with the first control comprises manipulating the first control in accordance with the respective input corresponding to the holding portion of the sequence of one or more inputs to adjust the value associated with the first control.*

* * * * *